United States Patent
Caspi

(10) Patent No.: US 7,338,246 B2
(45) Date of Patent: Mar. 4, 2008

(54) SPLIT NUT WITH MAGNETIC COUPLING

(76) Inventor: Roni Yaron Caspi, 616 N. Sweetzer Ave., Suite 312, Los Angeles, CA (US) 90048

( * ) Notice: Subject to any disclaimer, the term of this patent is extended or adjusted under 35 U.S.C. 154(b) by 0 days.

(21) Appl. No.: 11/483,729

(22) Filed: Jul. 11, 2006

(65) Prior Publication Data

US 2007/0212196 A1    Sep. 13, 2007

Related U.S. Application Data

(63) Continuation-in-part of application No. 11/366,610, filed on Mar. 3, 2006.

(51) Int. Cl.
*F16B 38/08* (2006.01)
*F16B 37/16* (2006.01)

(52) U.S. Cl. ........................ 411/432; 411/437
(58) Field of Classification Search ............ 411/432, 411/437
See application file for complete search history.

(56) References Cited

U.S. PATENT DOCUMENTS

| | | | |
|---|---|---|---|
| 1,366,884 A | 1/1921 | Nahrung | |
| 1,803,888 A | 5/1931 | Basola et al. | |
| 1,951,581 A | 3/1934 | Smith et al. | |
| 2,664,023 A | 12/1953 | Mugford | |
| 2,789,457 A * | 4/1957 | Allen | 411/432 |
| 3,009,225 A * | 11/1961 | Budreck | 24/303 |
| 4,132,146 A | 1/1979 | Uhlig | |
| 4,572,032 A | 2/1986 | Kinzler | |
| 4,657,458 A | 4/1987 | Woller et al. | |
| 4,872,790 A | 10/1989 | Sibole | |
| 4,968,190 A | 11/1990 | Sibole | |
| 5,039,266 A | 8/1991 | Nagayoshi et al. | |
| 5,099,215 A * | 3/1992 | Woods et al. | 335/216 |
| 6,206,620 B1 | 3/2001 | Burns | |
| 6,514,027 B1 | 2/2003 | Yiu et al. | |
| 6,666,639 B2 | 12/2003 | Van Gent | |
| 7,090,454 B2 * | 8/2006 | Shain | 411/431 |
| 2004/0200043 A1 * | 10/2004 | Wong et al. | 24/303 |

FOREIGN PATENT DOCUMENTS

DE        3429362 A1 *    2/1986

* cited by examiner

*Primary Examiner*—Katherine Mitchell
(74) *Attorney, Agent, or Firm*—Hoffman, Wasson & Gitler, P.C.

(57) ABSTRACT

A split nut has two halves securely fastened to one another by magnets. The magnets may be attached to the nut or the nut itself can be magnetized. The magnets secure the two halves together so that the threads of each half are in alignment and the nut may be moved along a threaded shaft. The nut may be attached to a threaded shaft anywhere along the length of the shaft. The nut has the ability to realign or reform a damaged portion of the threaded shaft. The nut can also be used for tightening, in the manner of a conventional nut. Moreover, the nut can be used for extracting by pushing, as for example in removing steering wheels for a steering column. Also, if provided with a gasket, the nut can stop leaks.

7 Claims, 5 Drawing Sheets

SPLIT NUT WITH MAGNETIC COUPLING

This application is a continuation in part of Ser. No. 11/366,610, filed Mar. 3, 2006.

BACKGROUND OF THE INVENTION

Conventionally, nuts are screwed onto threaded shafts at the end of the shaft. Repeated rotation of the nut causes the nut to move along the shaft to its final desired position. Sometimes this process is not possible. The shaft may run between two pieces, resulting in no available end for the placement of a nut. Also, damage to the threads prevents the entry of the nut on the end of the shaft.

It is often advantageous to be able to place a nut anywhere along the length of a threaded shaft. The prior art discloses split nuts which may be placed about a threaded shaft. One such disclosure is found in U.S. Pat. No. 2,664,023 (Mugford). Mugford discloses a snap-on split nut having two halves connected by a hinge 32. U.S. Pat. No. 4,657,458 (Woller et al.) discloses an anchor nut for a threaded member having two halves connected together by a thin flexible web or hinge 28 enabling the two sections to be moved from an unfolded position to a folded position. U.S. Pat. No. 5,039,266 (Nagayoshi et al.) discloses a divided nut, having two halves connected together by a hinge 9 or connected by a bayonet coupling.

Split nuts using thin flexible hinges suffer from several problems. Repeated use of the nut will cause metal fatigue in the hinge and eventual breakage. Also, during transportation or use, a hinge may easily become bent or twisted preventing the alignment of the two halves of the nut. Misalignment of the nut causes a misalignment of the threads rendering the nut unusable. Also, the flexible hinge often protrudes outside the perimeter of the nut preventing the application of a tool used for tightening. Other prior art devices, such as disclosed in U.S. Pat. No. 4,572,032 (Kinzler), U.S. Pat. No. 4,132,146 (Uhlig), U.S. Pat. No. 1,803,888 (Basola et al.) and U.S. Pat. No. 6,206,620 (Burns) disclose nuts and dies having hinges more substantial than a thin web of material. These hinges increase the manufacturing cost of the nuts and makes these nuts less likely to be bought and used.

SUMMARY OF THE INVENTION

A split nut has two halves securely fastened to one another by magnets. The magnets may be attached to the nut or the nut itself can be magnetized. The magnets secure the two halves together so that the threads of each half are in alignment and the nut may be moved along a threaded shaft. The nut may be attached to a threaded shaft anywhere along the length of the shaft. The nut has the ability to realign or reform a damaged portion of the threaded shaft. The nut can also be used for tightening, in the manner of a conventional nut. Moreover, the nut can be used for extracting by pushing, as for example in removing steering wheels for a steering column. Also, if provided with a gasket, the nut can stop leaks.

DETAILED DESCRIPTION OF THE INVENTION

Figure 1:
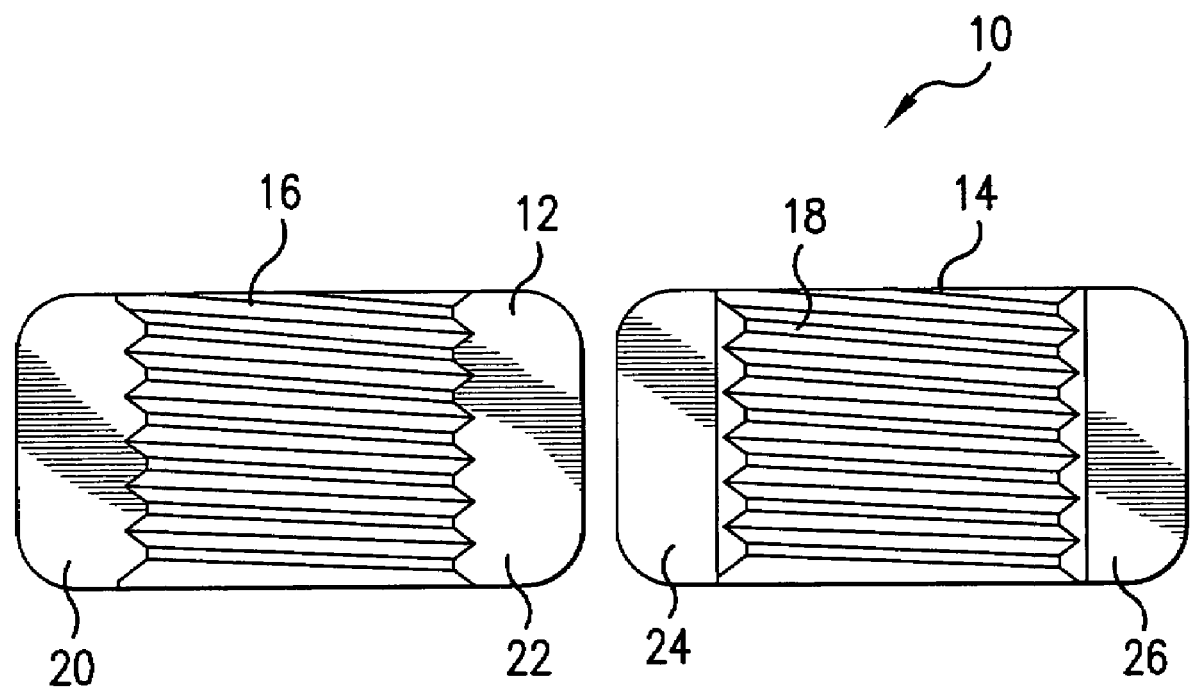
FIG. 1 is a side view of both of the two nut halves.

FIG. 1, the split nut 10 is seen as having a first half 12 and second half 14. The nut maybe made of any material, such as steel or plastic. The first half has end faces 20, 22 and an inner surface with threads 16. The second half 14 has end faces 24, 26, each provided with a magnet. The magnets are secured to the end face in any conventional manner, such as with adhesive. The inner surface of the second half 14 has threads 18. The threads may be any type and chosen based on the application of the nut.

Figure 2:
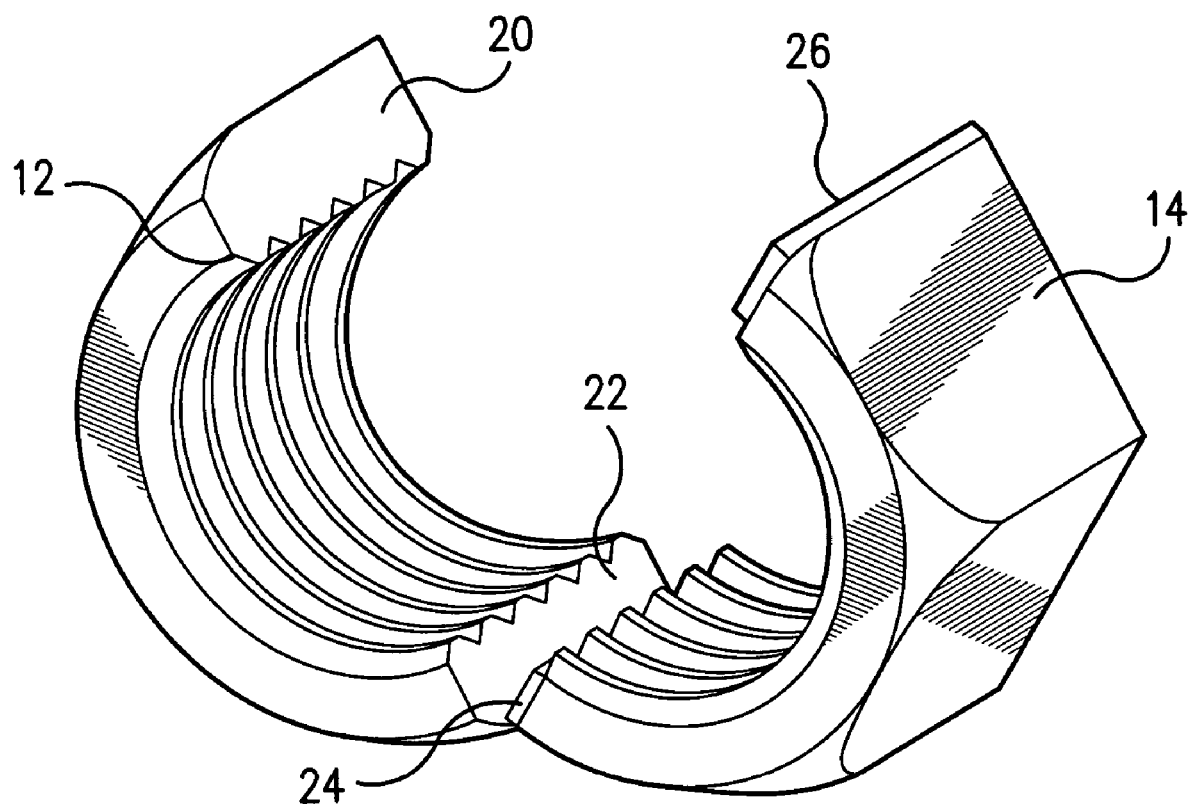
FIG. 2 is a perspective view of the two nut halves.
Figure 3:
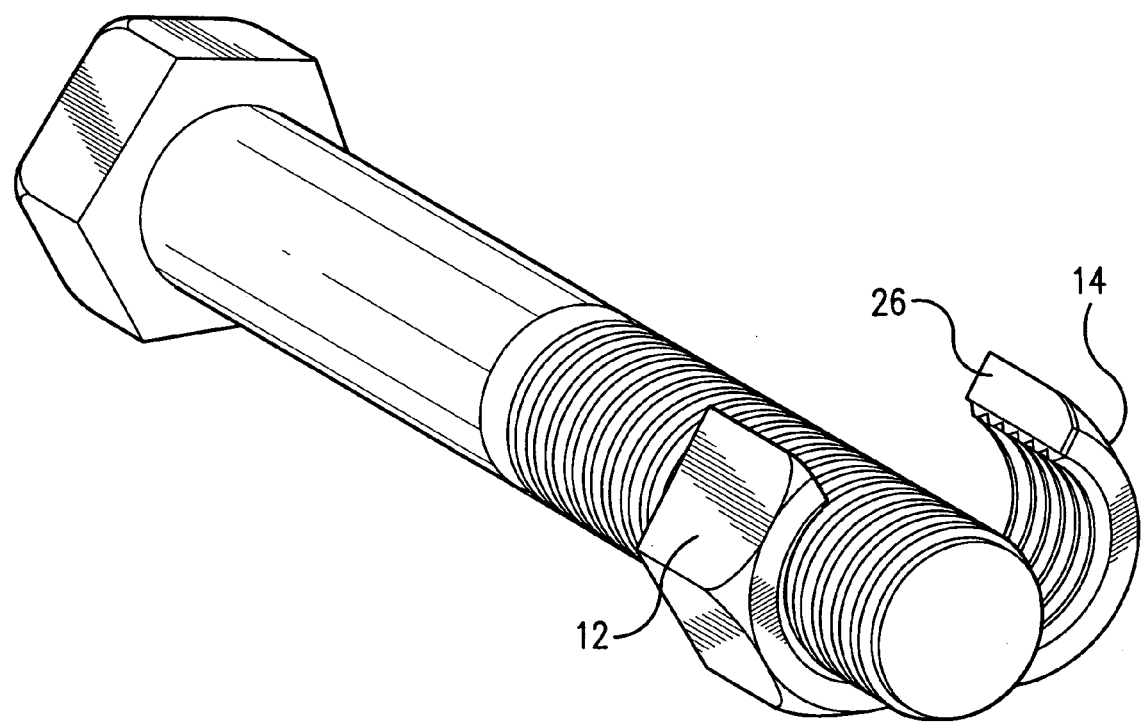
FIG. 3 is a perspective view of the two nut halves about a bolt.

FIG. 2 shows the two halves with the first magnet 24 in alignment with the end face 22 and the second magnet 26 still having to be brought into contact with the end face 20. With the halves being separable but easily joined, the nut can be placed about a threaded shaft without having to start the nut at the end of the shaft and rotating it to its desired position. The nut halves placed about a bolt is readily seen in FIG. 3. In place of the magnet, the region about the end face can be magnetized. In this way, there is no need for a separate magnet as a portion of the nut itself is magnetized. The portion can be the contact surface or can encompass an entire half. Alternatively, only one magnet may be used. This facilitates the removal of the nut from the bolt if the need arises for any reason. It may be difficult to separate the two halves from each other while the nut is attached to the bolt when two magnets are used.

Figure 4:
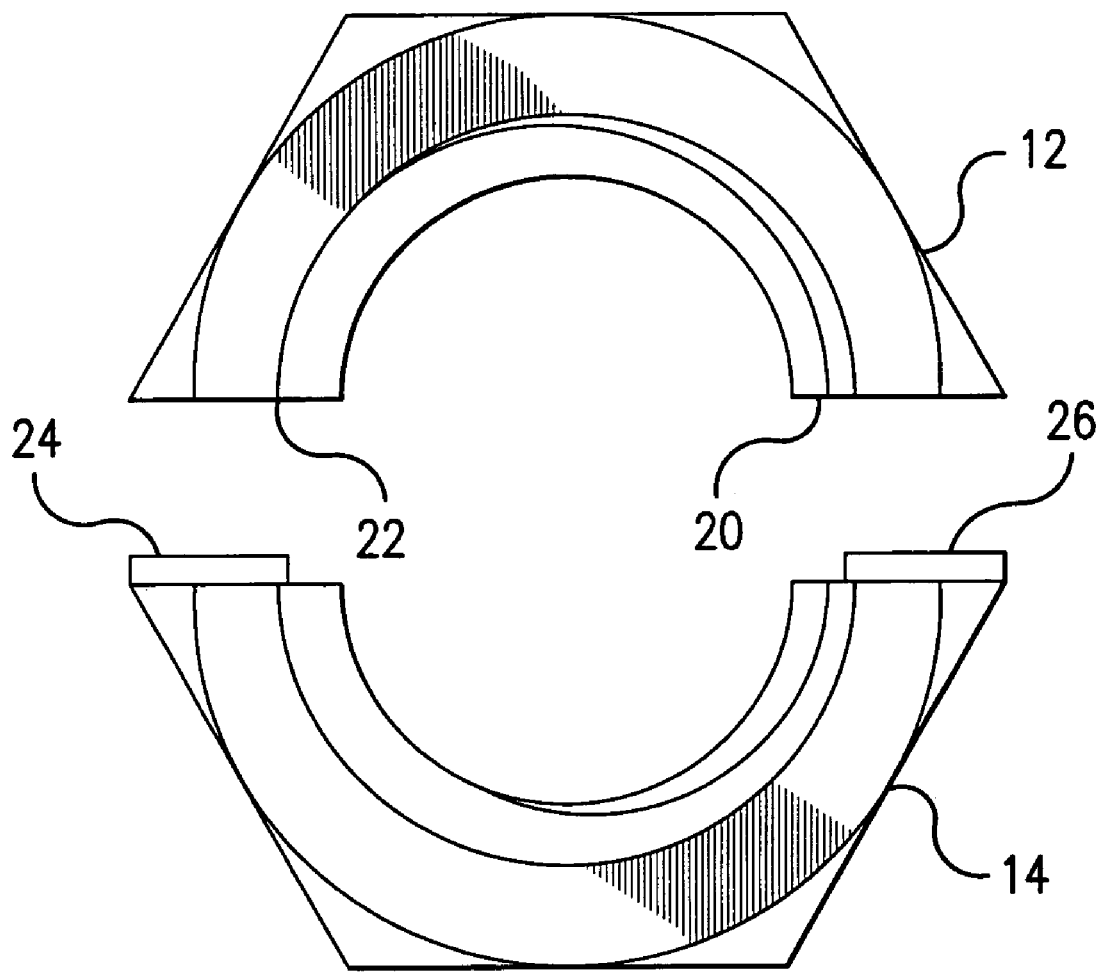
FIG. 4 is a top view of the nut halves connected to one another.

FIG. 4 shows the two halves joined to one another. Once joined, the threads are aligned to form a helical path mating with the threads. The outer surface has a conventional hexagonal shape to receive a tightening tool, such as a wrench or socket. The outer surface of the split nut can have any desired shape for its application. Once joined, the two halves 12, 14 are securely held to one another to function as a conventional one piece nut. The nut can be used for tightening by securely holding its place along a desired location on a threaded shaft or can be used to reform threads on the bolt.

Figure 5:
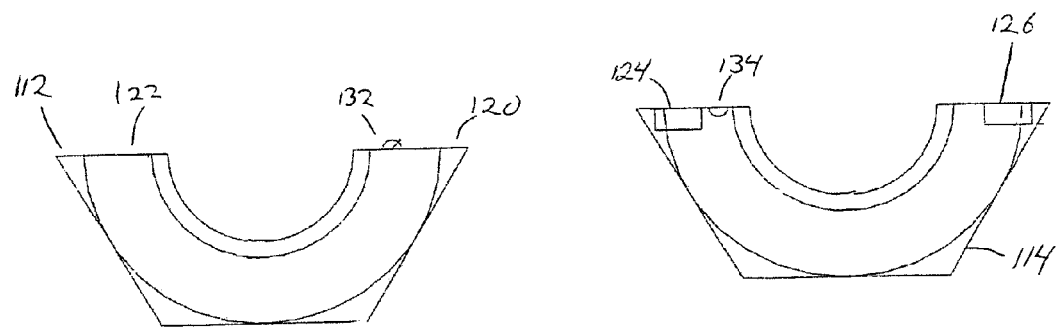
FIG. 5 is a side view of two halves of an alternative embodiment.
Figure 6:
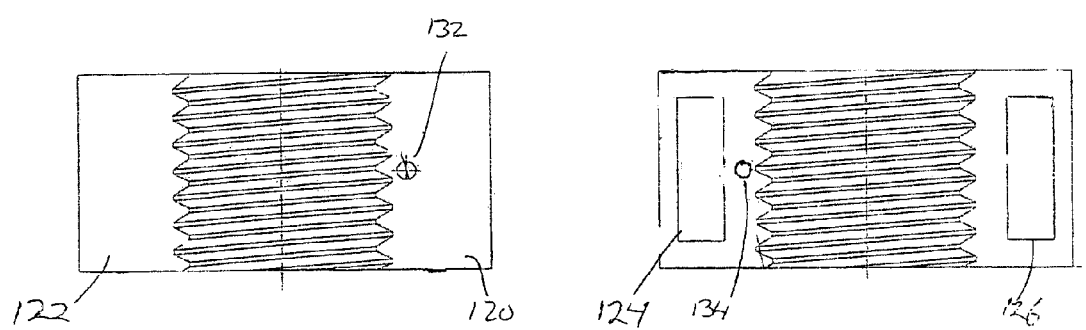
FIG. 6 is an end view of two halves of the alternative embodiment.

FIGS. 5 and 6 show an alternative embodiment of the invention. The nut is formed by two halves 112, 114. The first half 112 has end faces 120, 122 with end face 120 formed with a nub or projection 132. While the nub or projection is shown as being semi-spherical, it could be cylindrical or any appropriate shape for forming a post. The second half 114 has end faces with recessed magnets 124, 126. One end face is provided with a recess 134 for receiving the nub 132. All features are clearly shown in FIG. 6 where the nub 132 is seen formed on the end face 120 and in position for registry with the recess 134.

While only one nub and recess are shown, any number may be used. Also, as before, each half may be provided with a magnet for joining with the other half rather than having both magnets on one half. Also, in place of or in addition to the magnets 124, 126, the nub 132 may be magnetic. In one instance, recesses are formed in both halves and a cylindrical or spherical magnet is secured in one recess.

While a preferred embodiment has been described, variations and modifications would be apparent to one of ordinary skill in the art. For instance, each half of the nut may have one magnet with that end face mating with the end face of the other half not having a magnet. Also, the magnets 24, 26 may be held within recesses in the end face so that once the two halves are joined, the magnets are not visible.

I claim:

1. A nut comprising
a first half having an outer surface, an inner surface, a top surface, a bottom surface, a first end face and a second end face, said inner surface having a plurality of thread sections, no single thread section defining a continuous helix,
a second half having an outer surface, an inner surface, a top surface, a bottom surface, a first end face and a second end face, said inner surface having a plurality of thread sections, no single thread section defining a continuous helix,
said first half and said second half magnetically coupled to one another.

2. The nut of claim 1, wherein
said respective outer surfaces of said first half and said second half each have three sides.

3. The nut of claim 1, wherein
said magnetically coupled is accomplished by a magnetic coupler comprising
a first magnet attached to said first end face of said first half and
a second magnet attached to said second end face of said first half.

4. The nut of claim 3, wherein said first and second magnets are within recesses of said first and second end faces of said first half.

5. The nut of claim 1, wherein said magnetically coupled is accomplished by a magnetic coupler that is a single magnet.

6. The nut of claim 1 further comprising a post on an end face of said first half and a recess on an end face of said second half, said post engaging said recess when the two halves are coupled.

7. The nut of claim 6, wherein said post is a semispherical nub.

* * * * *